Dec. 29, 1931.  H. E. COLEY  1,839,086
APPARATUS FOR THE REDUCTION OF ORES, OXIDES, AND THE LIKE
Filed Aug. 24, 1928    3 Sheets-Sheet 1

Inventor
Henry Edwin Coley
By  J. Kaplan
Attorney

Dec. 29, 1931.  H. E. COLEY  1,839,086
APPARATUS FOR THE REDUCTION OF ORES, OXIDES, AND THE LIKE
Filed Aug. 24, 1928    3 Sheets-Sheet 2

Inventor
Henry Edwin Coley

By  J. Kaplan
Attorney

Dec. 29, 1931.  H. E. COLEY  1,839,086
APPARATUS FOR THE REDUCTION OF ORES, OXIDES, AND THE LIKE
Filed Aug. 24, 1928   3 Sheets-Sheet 3

Inventor:
H. E. COLEY,
By Blair & Kilcoyne
Attys.

Patented Dec. 29, 1931

1,839,086

UNITED STATES PATENT OFFICE

HENRY EDWIN COLEY, OF LONDON, ENGLAND

APPARATUS FOR THE REDUCTION OF ORES, OXIDES, AND THE LIKE

Application filed August 24, 1928, Serial No. 301,889, and in Great Britain September 14, 1927.

This invention relates generally to apparatus for the reduction of ores, oxides and the like of zinc and other suitable volatile metals and in particular to apparatus for the subsequent process of effecting the separation of the metallic vapours or fume from the other gases evolved in the process of reduction and their condensation.

Normally this vapour or fume is passed from the reducing chamber and is collected either in bags or in some form of collecting chamber for subsequent distillation into the metal.

According to the present invention the metallic vapours are separated from the other gases by means of a liquid such as water or paraffin and such liquid is used to convey the separated metallic product to either a collecting chamber and then a filter press or the like or directly to the filter press or the like.

One method of effecting the desired separation according to the present invention consists in causing the heated vapours to pass from the reducing chamber directly into the lower end of a water-jacketed or other artificially cooled vertical chamber, and introducing a liquid into the upper end of the vertical chamber by means of one or more jets or sprays whereby finely divided drops of liquid are caused to fall through the ascending volume of hot vapours and to thereby effect the separation of the metallic vapours from the other gases and to carry the condensed and separated metallic product out of the vertical chamber for further treatment.

I have found that whilst it is necessary to sub-divide the separating liquid as finely as possible it is yet inadvisable to disseminate the same in the form of a mist as in this form it is too readily converted into steam by the hot vapours.

In order that the invention may be clearly understood and carried into effect an example of a suitable apparatus and one method of applying the same to an ore reducing chamber will now be described by aid of the accompanying drawings in which:—

Figure 1:
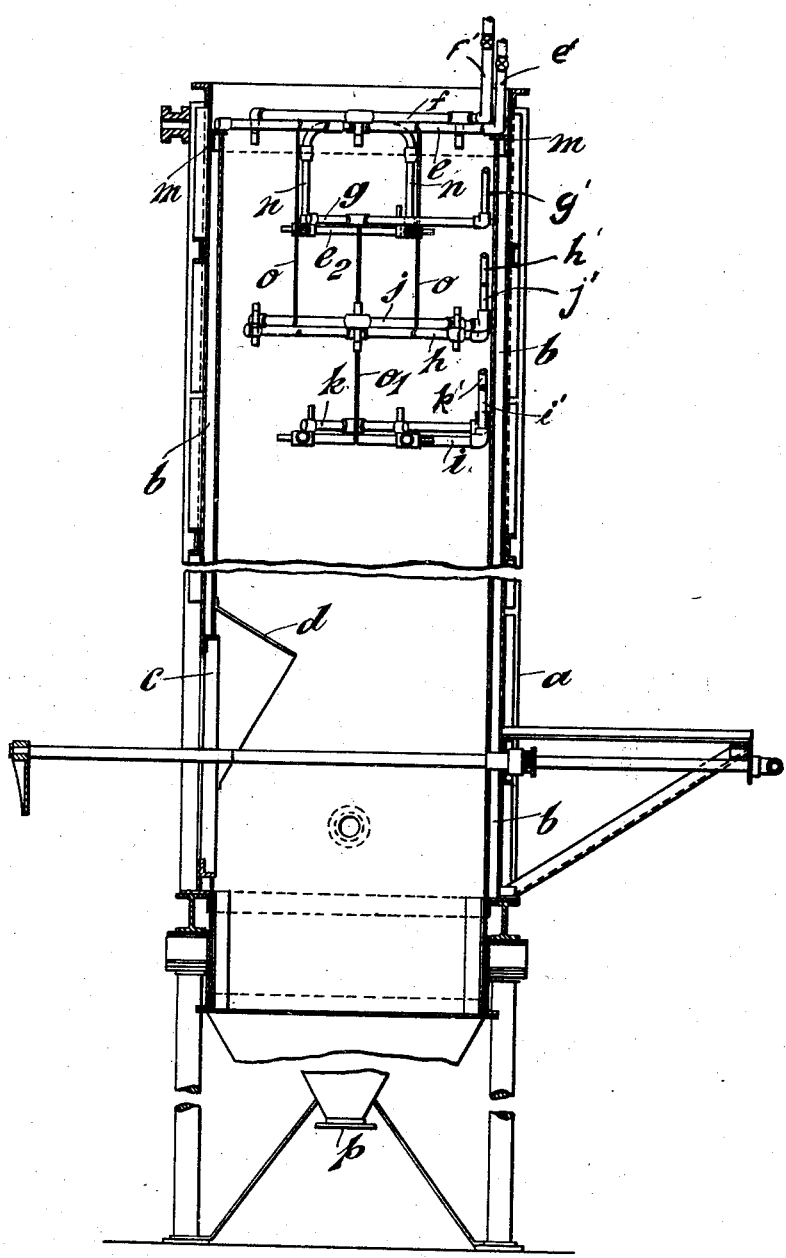
Fig. 1 is a vertical section through a condensing chamber or vessel according to the present invention.
Figures 2, 3:
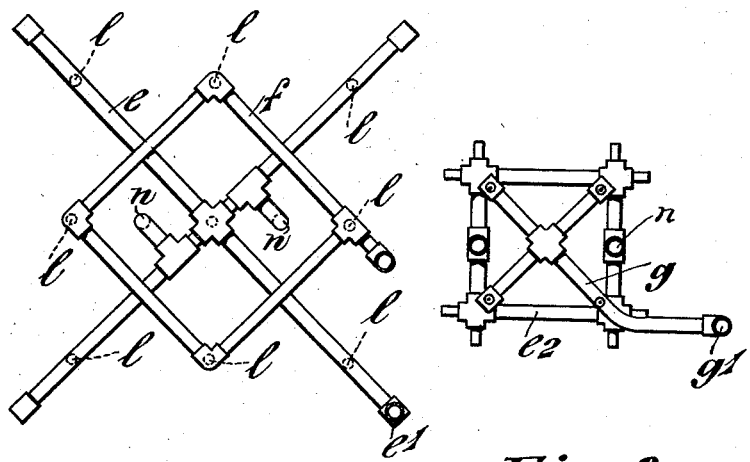
Figs. 2 to 5 illustrate in plan a series of seven water spraying devices each embodying a plurality of jets or nozzles.
Figures 4, 5:
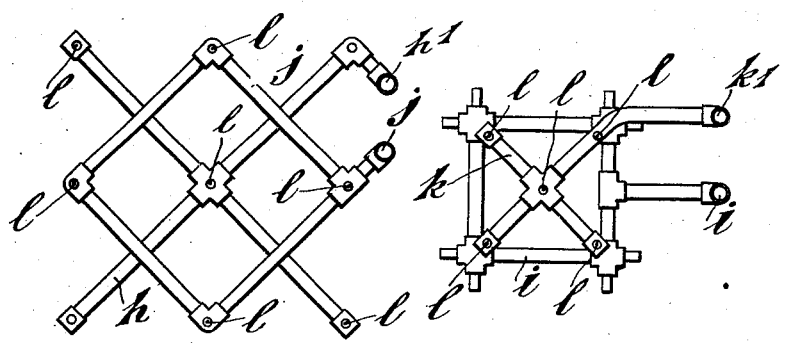

Referring to Figs. 1 to 5 of the drawings the condensing vessel therein illustrated consists of a vertical tower $a$ of rectangular cross section having double walls to form a space $b$ through which water is circulated thus forming a water-jacket to maintain the inner wall of the tower cool throughout the whole of the surface which is normally contacted by the hot vapours or fume from the reducing plant. Such vapours enter the tower near its lower end through an inlet $c$ of comparatively large area which inlet is shielded against the separating liquid by means of a splash guard $d$.

The separating liquid is introduced at the upper end of the tower and is caused to fall down through the tower as rain, the jets or nozzles used for disseminating the water being so disposed as to produce a falling body of finely sub-divided drops of liquid, the cross-sectional area of said body being equivalent to the cross-sectional area of the interior of the tower. This is effected in the example illustrated by utilizing as the carriers for the jets or nozzles skeleton frames built up from pipes which serve to convey the water to the respective jets, each frame being separately supplied with liquid and separately controlled by means of suitable valves. Seven of these frames are illustrated in the drawings and are indicated by the reference characters $e, f, g, h, i, j, k$. The inlets for these tubular frames are indicated by the reference characters $e', f', g', h', i', j'$ and $k'$. The jets or nozzles are indicated at $l$.

The frame $e$ is adapted, in the present example to be supported by brackets $m$ at the upper end of the tower which end is open for the escape of the separated gases. The frame $e$ in turn serves as a support for the frame $f$ in the manner shown in Fig. 2. The frame $e$ includes a supplementary frame $e^2$ which is connected to it by means of a pair of depending pipes $n$ see Figs. 1, 2 and 3. This supplementary frame $e^2$ serves as a support for the frame $g$ see Fig. 3. The frame $h$ is suspended from the frame $e$ by means of hangers $o$. Similar hangers $o'$ are used to support the frame $i$, from the supplementary frame $e^2$. The remaining frames $j$ and $k$ are supported by the frames $h$ and $i$ respectively. The outlet for the separating water and the separated metallic product is at the lower end of the tower and is indicated at $p$. The liquid passing out through the outlet $p$ may be either caused to flow by gravity to a collecting tank or chamber wherein the metallic product is permitted to settle on the surface of the liquid as scum and thus be collected the liquid then being pumped through suitable filter presses or other separating devices or it may be pumped directly from the tower or condensing vessel to such filter presses or the like.

Figure 6:
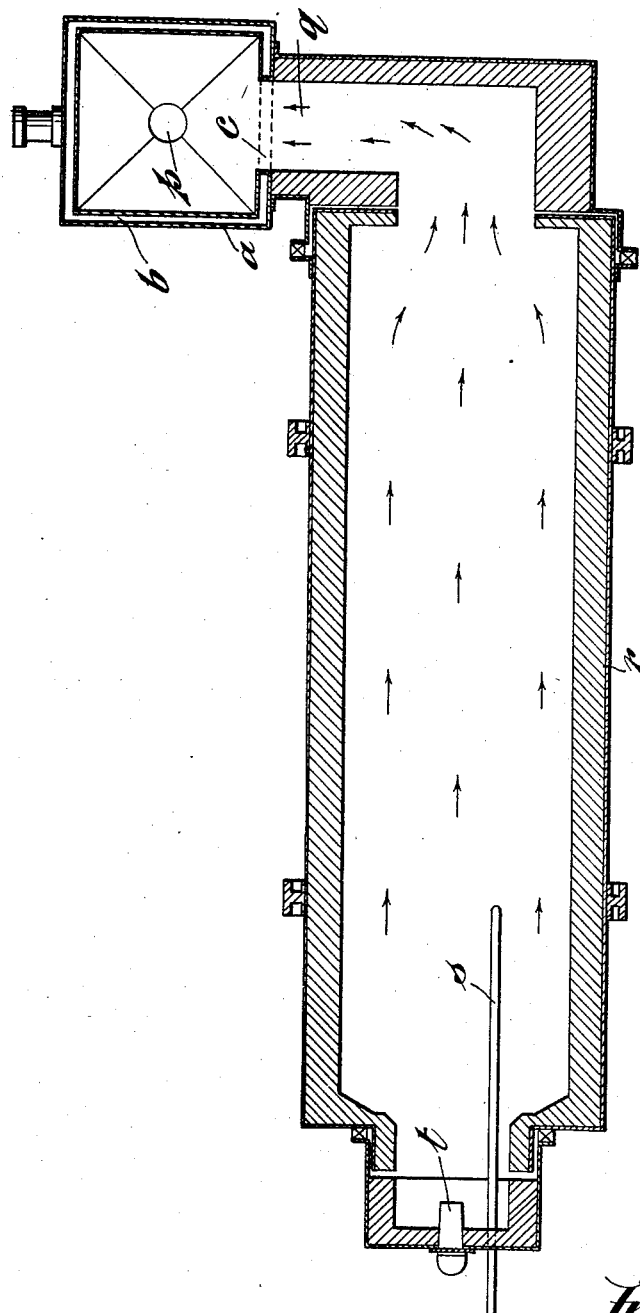
Fig. 6 is a sectional plan view, somewhat diagrammatic showing one manner of associating the condensing vessel with an ore reducing plant such for example as is described in the specification of my prior patent application Serial No. 211,293 filed August 6th, 1927.

In Fig. 6 the condensing vessel $a$ is shown coupled to the vapour outlet $q$ of a reducing chamber $r$ of the rotary tube type such as described in the specification of my prior patent application Serial No. 211,293 filed August 6th, 1927. The water-cooled inlet tube for the hydrocarbon reducing agent is indicated at $s$. This chamber $r$ is adapted to be internally heated by means of an oil burner $t$.

The reduction of the ore, oxide or the like within the reducing chamber $r$ is effected by the method which consists in heating the ore or the like to its reducing temperature and when at that temperature introducing into or onto it a liquid or solid hydrocarbon through the water-cooled pipe $s$ or a water-cooled conveyor so that nascent carbon is produced at the surface of the ore and effects the reduction as described in the specification of my prior patent application Serial No. 672,451 filed November 2, 1923.

In the reduction of zinc and other volatile metals from their ores, oxides or the like, the separation of the metallic vapours or fume from the other gases evolved in the process of reduction and their condensation is effected according to the apparatus illustrated by causing the heated vapours to pass from the reducing chamber directly into the lower end of the vertical condensing vessel, and then introducing a liquid such as water or paraffin into the upper end of such vessel by means of jets or nozzles whereby finely divided drops of liquid are caused to fall through the ascending volume of hot vapours and to thereby effect the separation of the metallic vapours from the other gases and to carry the condensed and separated metallic product out of the condensing chamber for further treatment.

The quantity of separating liquid used may be varied in accordance with requirements by cutting out one or more of the jet carrying frames $e$ to $k$.

The liquid supplied to the jacket of the condensing vessel may form part of the supply of separating liquid, or be derived from an independent source.

I claim:

In apparatus for the reduction of ores of volatile metals including a reducing chamber and means to condense the metallic vapours from the gaseous reduction products, the combination comprising a jacketed condensing chamber having an inlet in one side wall thereof adjacent the lower end of said chamber for the vapours to be condensed, a conduit directly connecting said inlet to the reducing chamber so as to prevent entrance of air, said condensing chamber having an outlet at the upper end thereof, spray means in the upper end of said chamber below said outlet, means for supplying said spray means with a cooling liquid, and an outlet at the lower end of said chamber to permit the continuous removal of the cooling liquid and condensed metallic product, the arrangement being such that the vapours to be condensed ascend in the condensing chamber into contact with descending rain of cooling liquid whereby the metallic vapours are condensed and, with the cooling liquid, escape through the outlet in the lower end of the chamber, and the gases freed of metal escape through the outlet at the upper end of the chamber.

In testimony whereof I affix my signature.

HENRY EDWIN COLEY.